US008949960B2

(12) United States Patent
Berkman et al.

(10) Patent No.: US 8,949,960 B2
(45) Date of Patent: Feb. 3, 2015

(54) PRIVACY PRESERVING KNOWLEDGE AND FACTOR POSSESSION TESTS FOR PERSISTENT AUTHENTICATION

(71) Applicant: Google Inc., Mountain View, CA (US)

(72) Inventors: Omer Berkman, Tel Aviv (IL); Marcel M. M. Yung, New York, NY (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 13/844,619

(22) Filed: Mar. 15, 2013

(65) Prior Publication Data

US 2014/0282942 A1 Sep. 18, 2014

(51) Int. Cl.
*G06F 21/31* (2013.01)
*G06F 21/44* (2013.01)

(52) U.S. Cl.
CPC ............... *G06F 21/31* (2013.01); *G06F 21/44* (2013.01)
USPC .......................................................... 726/6

(58) Field of Classification Search
CPC combination set(s) only.
See application file for complete search history.

(56) References Cited

U.S. PATENT DOCUMENTS

| | | | |
|---|---|---|---|
| 7,725,730 B2 | 5/2010 | Juels et al. | |
| 8,842,827 B2 * | 9/2014 | Hammouri et al. | 380/44 |
| 2003/0163737 A1 | 8/2003 | Roskind | |
| 2004/0249817 A1 | 12/2004 | Liu et al. | |
| 2006/0085647 A1 * | 4/2006 | Neff | 713/180 |
| 2007/0124321 A1 | 5/2007 | Szydlo | |
| 2007/0162961 A1 | 7/2007 | Tarrance et al. | |
| 2009/0106551 A1 | 4/2009 | Boren et al. | |
| 2011/0191837 A1 * | 8/2011 | Guajardo Merchan et al. | 726/6 |

FOREIGN PATENT DOCUMENTS

| | | |
|---|---|---|
| CN | 101145911 | 10/2007 |
| JP | 2006-244095 | 9/2006 |
| JP | 2013-020312 | 1/2013 |

OTHER PUBLICATIONS

International Search Report and Written Opinion for PCT/US2014/022075, 14 pgs.

* cited by examiner

*Primary Examiner* — Beemnet Dada

(74) *Attorney, Agent, or Firm* — Procopio, Cory, Hargreaves & Savitch LLP

(57) ABSTRACT

Example implementations described herein are directed to authentication based on the user's private factors, while not revealing at the server side information allowing the server (or anyone with the server's information) to deduce the private answers. In example implementations, the user answers a questionnaire with authentication factors, wherein the answers are transformed in a one-way fashion and the transformed answers are provided to the server side. Example implementations facilitate authentication based on polynomial interpolation or other methods to permit a user to authenticate, even if the user does not answer all of the questions correctly.

16 Claims, 6 Drawing Sheets

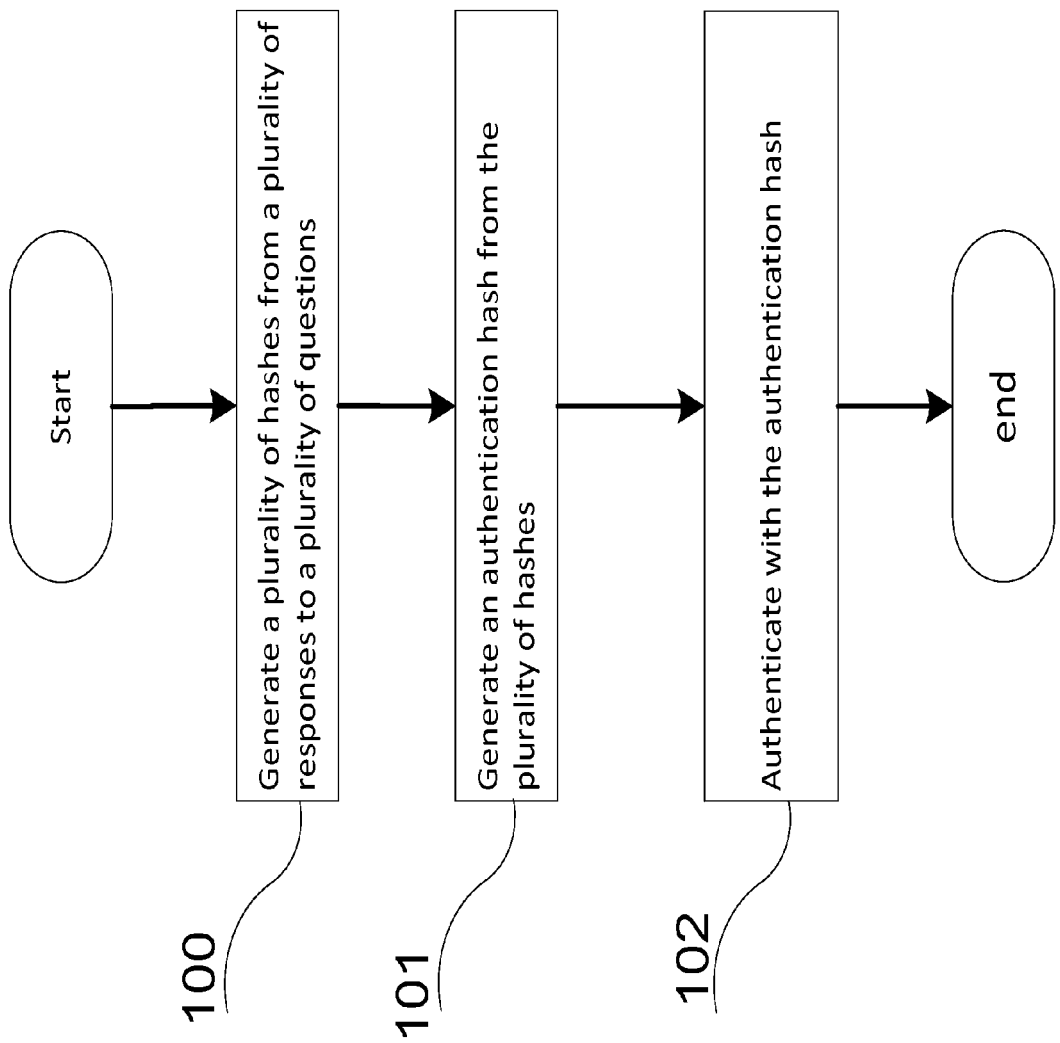

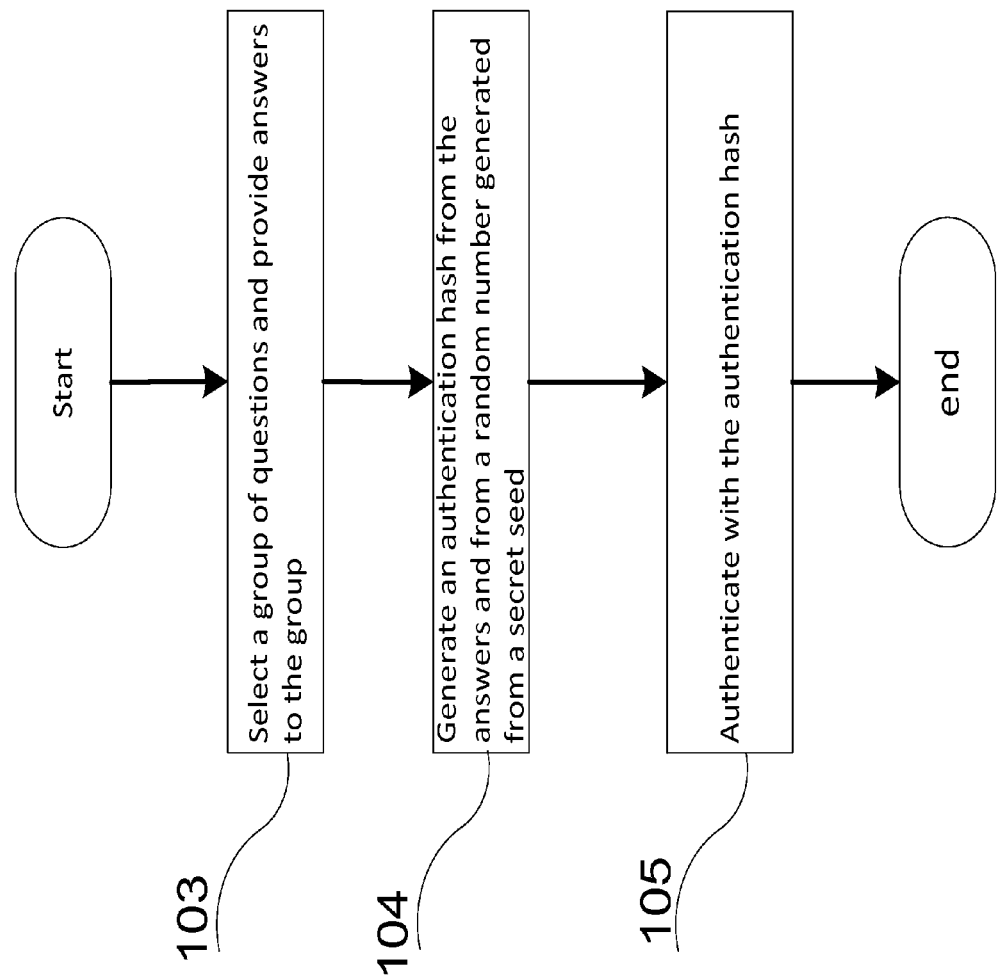

PRIVACY PRESERVING KNOWLEDGE AND FACTOR POSSESSION TESTS FOR PERSISTENT AUTHENTICATION

BACKGROUND

1. Technical Field

Aspects of the example embodiments relate to privacy preservation tests for persistent authentication, and more specifically, to devices, method, and system for generation of an authentication hash or other one-way hard to invert function, and authentication based on the generated authentication hash, such that the answers to private questions are not revealed at the server side.

2. Related Art

A user may need to prove his or her identity in various situations during an authentication process of users for access and for recovery of accounts. To facilitate authentication or alternative methods for authentication (e.g. fault tolerant/recovery), users register factors (e.g., answer to questions specific to user's life and taste) with the server holding the access (e.g., account provider). Registration by the user including the answers may reveal private user information to the server. Unauthorized access to the server by a malicious party may reveal private user information to that malicious party. For example, that party (e.g., insider to the server organization or an outsider or a phishing attacker) may exploit the registered answers at other or the same account providers which may require similar answers, and impersonate the user.

For authentication, there is a need to allow the user to answer questions (or provide other private factors, such as biometric information, possessed information stored outside the systems, etc.), while for privacy reasons, not having the server verifying the information from the user to hold the private information.

SUMMARY

Aspects of the present application may include a device, which involves a processor, configured to generate a plurality of hashes from a plurality of responses to a plurality of questions; generate an authentication hash from at least one of a polynomial interpolation of the plurality of hashes, and a selection of one or more of the plurality of hashes to form the authentication hash based on a selected group of the plurality of questions; and authenticate with the authentication hash.

Aspects of the present application further include a computer readable storage medium storing instructions for executing a process. The instructions may involve generating a plurality of hashes from a plurality of responses to a plurality of questions; generating an authentication hash from at least one of: a polynomial interpolation of the plurality of hashes, and a selection of one or more of the plurality of hashes to form the authentication hash based on a selected group of the plurality of questions; and authenticating with the authentication hash.

Aspects of the present application further include a server, which may include an processor configured to transmit a plurality of questions; and grant access when an authentication hash responsive to the transmitted plurality of questions matches a secret authentication hash; and deny access when the authentication hash does not match the secret authentication hash; wherein the authentication hash is generated from at least one of: a polynomial interpolation of the plurality of hashes, and a selection of one or more of the plurality of hashes to form the authentication hash based on a selected group of the plurality of questions.

BRIEF DESCRIPTION OF THE DRAWINGS

FIGS. 1(a) and 1(b) illustrate a flow diagram for a device, in accordance with an example implementation.

DETAILED DESCRIPTION

Figure 2A:
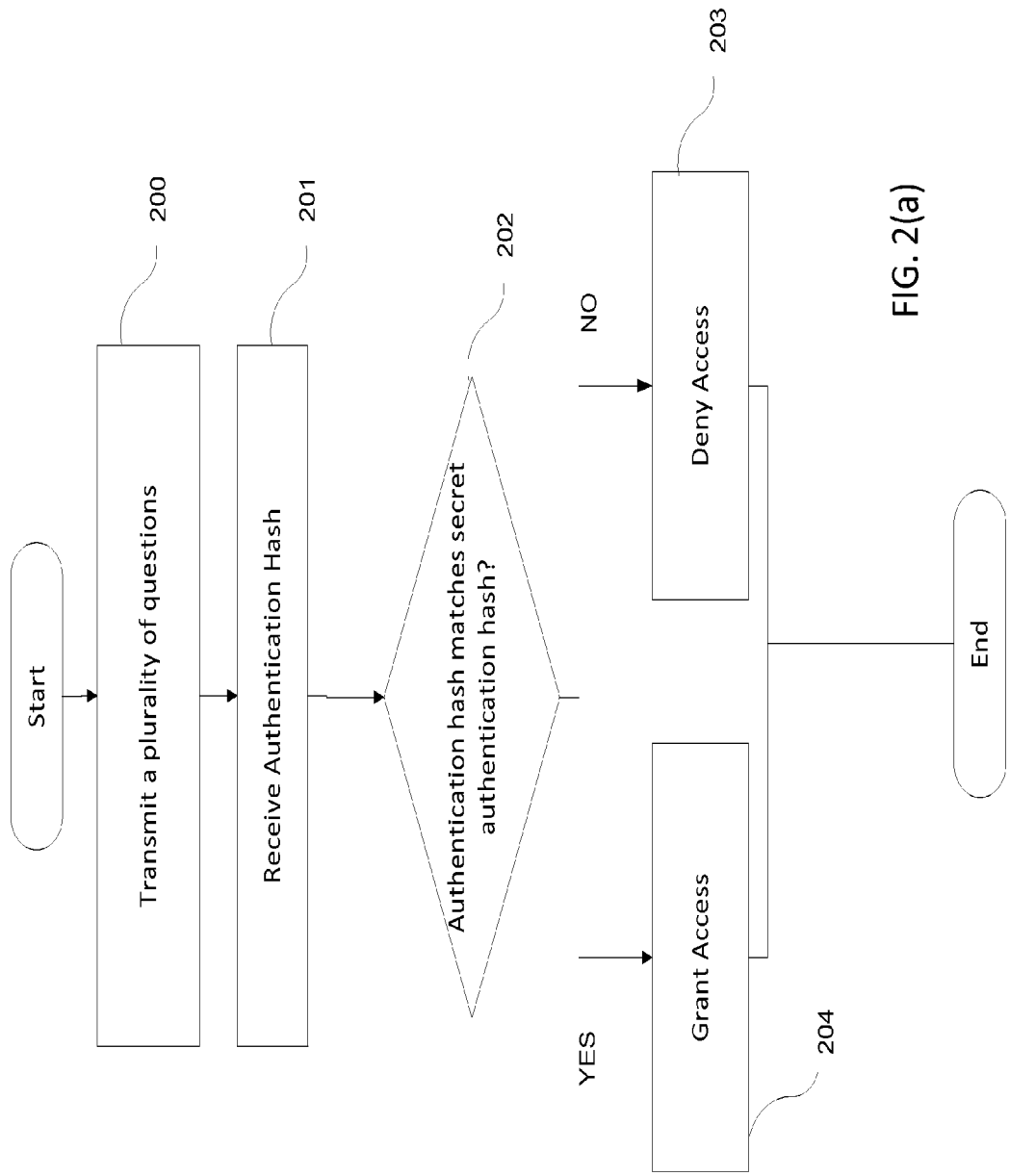
FIGS. 2(a) and 2(b) illustrate a flow diagram for a server, in accordance with an example implementation.

The subject matter described herein is taught by way of example implementations. Various details have been omitted for the sake of clarity and to avoid obscuring the subject matter. The examples shown below are directed to structures and functions for implementing measurement of campaign performance with privacy preservation. Aspects of the example implementations may relate to e-commerce, information sharing, privacy preserving methods, encryption and cryptographic methodologies, transaction systems, private information sharing, and secure computing, for example. However, the example implementations are not limited thereto, and may be applied to other fields, without departing from the scope of the present inventive concept.

Example implementations described herein are directed to authentication based on the user's private factors, while not revealing at the server side information allowing the server (or anyone with the server's information) to deduce the private answers. In example implementations, the user answers a questionnaire with authentication factors, wherein the answers are transformed in a one-way fashion and the transformed answers are provided to the server side. This protects the user's privacy while allowing the server to authenticate the original user who registered information with the server.

Example implementations are directed to allowing a plurality of factors with sufficient entropy (e.g., strings) to be transformed together on the user device under a one-way (e.g., cryptographic hash) function, and to transmitting the transformed values to the server at registration. At an authentication session, the user is asked for the answers again, which are transformed in a similar fashion as described above by the device, and sent to the server. The server then compares the one-way transformed answers to the registered information. The following description is directed to more detailed programs/protocol which outline the mechanisms used in example implementations.

Protocol entities for example implementations may include a user, a user device, and a server. For purposes of clarity, protocol parameters are expressed as n, t, r, and m, which are described below.

In an example protocol environment, there are several aspects to consider, as described below.

Private registration information: The user has n labeled strings of private information. This can be something the user knows and is likely to remember, or factors that the user owns or otherwise possesses. In example implementations, the initial registration can be made valid, for example, after the user receives and responds to an acknowledgement sent to a device associated with the user (e.g., the user's phone and an account associated with the user such as an alternative email, or a friends' account).

Non-private labeling: The labels, format, possibly hints, and order of the strings are not private.

Persistence: At any time user knows at least n-t strings. That is, the user may have registered n strings, and cannot be assumed to always remember all of them and may forget t of them. Thus, the user is required to know some threshold of n-t of the strings. Note that the level required can be tuned by the server from one authentication session to another.

User device: User has access to a device that can input data securely, compute, erase data, save data, and output data. The device is under control of the user (e.g., it is not phishable). This can be a smartphone or a software element that is not connected to the web.

Device partial integrity: Device operates correctly (in particular, data is permanently erased when requested), but may get lost/stolen.

Server integrity: server operates correctly and never loses any data, as the server is interested in authenticating the user. Further, data stored for long term at the server does not contain data which allows attackers to impersonate a user.

Setup: During setup, the device and the server can exchange information securely.

The example protocol environment may also include several requirements, such as:

Privacy: Given knowledge of r of the private strings, information on the server, on the device, or information exchanged between the server and device should be substantially insufficient in revealing any of the remaining n-r strings or in guessing better than initially any of the remaining n-r strings.

Authenticity: At any time, the user can prove to the server (using the device) that the user knows at least n-t of the input strings (n-t is much larger than r). This authenticity operation determines a successful result of operation and the server may change the required threshold n-t possibly dynamically in various authentication sessions.

Security: Information on the server, on the device while not used by the user, or information exchanged between the server and device should be substantially insufficient for use to authenticate a user who may not be the original user who registered initially.

The example protocol environment may employ various protocols. For example, factor registration may be conducted to setup various factors. The factor registration may involve randomization, tabulation, answering and generation.

In the randomization aspect of the factor registration, the device and server may jointly generate randomness with a random number generator or other methods. In an example implementation, the server provides a long random (non secret) salt Rs to the device. The user may generate a long random (non secret) salt Ru, and enter Rs and Ru into the device. The device generates a long random (non secret) salt Rd and concatenates all three random salts into a single random salt R (salt R may be a factor to be employed by the server in further interactions).

In the tabulation aspect of the factor registration, label provisioning may be conducted. The server provides the user with a set of string labels and the respective possible formats of each string and a set of standard "hints" to be employed by the user. Label is a variable for which the user provides a value is in a string in a given format. The user may choose n labels out of the offered ordered set of labels to define the questionnaire. In example implementations, some elements in the questionnaire may not necessarily be of the "something you know" type, and other types of information (e.g., biometrics, customized questions, etc.) can be used as well.

In the answering aspect of the factor registration, the user provides questionnaire answers as n strings. The user can be trained by the system to repeat the answers as part of the process (e.g. user is asked twice, system employs techniques to increase user memory of the answers, etc.). The answers can be moved to the device.

The questionnaire can be kept secret or can be mixed with other methods that are open (e.g., the server knows direct answers to), depending on the desired implementation. For example, the questionnaire can be used in combination with other authentication methods, (e.g., as enhancing claim for identity rather than being the sole method.) For example, the combination can be used upon failure of other methods, after some initial success with other methods, before other methods are used, only when the user is already authenticated but requests further sensitive access/action.

In the factor generation aspect of the factor registration, the system generates the factors to remember based on the answers, and by utilizing an algorithm. For initializing the algorithm, the device is given n user secrets $u\_1, \ldots, u\_n$, wherein $u\_i$=the question $q\_i$ and the answer $a\_i$. The device generates n secrets $s\_1, \ldots, s\_n$, which are a hashing or a one way function of the $q\_i$'s. $s\_i$=HASH($a\_i$, R). The device from the points ($q\_i$, $s\_i$) for i=1,n can be generated by interpolation over a finite field a polynomial P of degree n-1 which passes through all the points in the plane. Each of $q\_i$ and $s\_i$ is interpreted in the finite field, for example the hash can be a string of 256 bits interpreted modulo a prime of size 256 bits as elements in the finite field defined by the prime, $q\_1$ and $s\_i$ generated via hashing are likely to be mapped to a random looking point which can be viewed as a point lying in the Cartesian plane with X and Y coordinates in the finite field. Finite fields, prime numbers, and polynomial interpolations are basic notions to the skilled in the art. The secret s is the value of the polynomial at 0 (i.e., P(0)=s), and can be registered at the server with a serial number. In addition, additional k=2t points on the polynomial, like the points (1, P(1)), (2,P(2)), ... (k, P(k)) are sent and registered at the server assuming these are not in the points originally used in the interpolation. This is i to allow the user to be wrong or omit t possible out of the n strings in future authentication. The polynomial P has degree n-1 (since it was generated by n points) and registration of the secret which is the point (o, P(0)) and added k points it should be that k+1 is smaller than n, and this k+1 points knowledge does not give the server the polynomial properties. For example, if the user is asked for 20 factors to answer, while reserving a threshold of requiring only 15 answers in the future, then ten points are sent to the server in addition to the secret. When a user authenticates in the future (to be described below as an example implementation), the user sends the factors again and the added 10 points are added to the representation of the polynomial, and noisy interpolation can be attempted by the user which includes these points. If an attacker attempts to impersonate, the attacker will always know less than ten points since the factors were chosen carefully to represent the user knowledge and possession of factors. Thus, the points sent by the server and the knowledge of an attempting impersonator will fail to interpolate the available points to recover the polynomial P.

In another example implementation, HASH(s) is maintained locally rather than s itself. The other information can be deleted or maintained by the device, or the k points be maintained at the server, depending on the desired implementation. For example, erasing the other information forces the user to enter the information again at the authentication, while maintaining the information can be used in proving possession of the device. HASH can be any one way function, a cryptographic hash algorithm, or an exponentiation with a generator over some finite field or another algebraic structure as known for modular exponentiation in the cryptographic literature. Keeping HASH(s) rather than s at the server prevents attackers who penetrate the server from learning s itself.

In an example implementation, an authentication session may be employed as described below. The authentication session may include various modes of use of the factors. In a first mode, the device is available, the user has access to the device and the secret s was not deleted. In the first mode, the device then informs the server of the hash's serial number and proves knowledge of the secret by using a secure protocol.

In a second mode of use, the server, the user and the device (or another device) collaboratively generate one of the hashes. The server sends to the user the n labels (questions) and their format. Then, the server sends to the device the n labels, and the salt R. The user enters to the device a_i the answers. The server also sends the k added points $(1,P(1)), \ldots (k,P(k))$. Using a noisy interpolation algorithm (e.g. Berlekamp Welch, Guruswami-Sudan, etc.) the device computes the polynomial and if a threshold of answers are correct (e.g., $\frac{2}{3}$ as in the example of 15 out of 20 above, half, etc.) the noisy interpolation algorithm produces s. If the device has HASH(s), the produced s can checked for correctness, and may ask the user for new answers (e.g., if incorrect, for initialization, etc.). The resulting s is sent to server, wherein the server authenticates the user, or alternatively, the user's device proves the possession of s based on HASH(s) which is sent to the server, and to this end zero-knowledge protocols or challenge-response protocols known in the art can be utilized.

If one of the points for the noisy interpolation algorithm is a randomizer (e.g., contributed by the server or local software) then the resulting factor is randomized (i.e., independent from the answers of the user). For example, assume initially that the $\frac{2}{3}$ bound from the Berlekamp Welch noisy interpolation algorithm can be tuned by having the server contribute some points. If a higher threshold is desired, then the server can contribute error points (not on the polynomial). Therefore, if the desired threshold is, for example, 16 out of 18 (16/18) points and the Berlekamp Welch noisy interpolation algorithm is employed, six errors can be introduced by either the server or the device so that 16/24 points are correct, thereby meeting the Berlekamp Welch threshold. In another example, if the implemented threshold requires only half of the answers to be correct, then "good polynomial points" can be introduced by the server or device. For example, if 10/18 (above half of the questions to be right) is considered to be sufficient, six good points can be introduced such that the result is 16/24, which meets the $\frac{2}{3}$ Berlekamp Welch threshold. Tuning of the required threshold can vary from one authentication session to another.

Because the information chosen is so private, the user should be able to recall almost all of the information. The complexity is that of evaluation of a polynomial in a finite field.

The strings can be very private and involve secret information that ensures that the user can recall most of them when required. Examples include names of siblings, of children, spouse, parents, grandparents, friends, addresses of self and relatives, account names and/or numbers, name of employers and others, depending on the desired implementation. The selection criteria for the strings should be such that the user is able to re-create the answers if required. The amount and variability of the data should be such that enough strings are never known to an attacker so that even with extra points from the server the attacker is unable to produce good interpolation points and the polynomial remains secret to the attacker.

In example implementations, several security levels can also be introduced. For example, the labels, formatting and order of the strings may themselves be protected by a few basic and easy to remember strings (e.g. password of the user)

For the purpose of account recovery and releasing accounts taken over by hijackers, an authentication factor should be employed that is used for the recovery process and has the following properties:

Persistent: always available to the user; user cannot lose it (or can re-create it) even if she loses a physical object containing the factor, or loses her account (e.g., by hijacking).

Un-forgeable: substantially impossible to guess even when given access to the account or to the personal user information. Should be un-forgeable both to random attackers and to associates of the user.

Private: does not reveal personal data to the account provider or to an attacker; and Available: implementable in general software systems without special-purpose devices.

There are several considerations for selecting factors. For example, if the persistent factor is "something the user has," the user may lose the factor or the factor may fall into the attacker's hands. If the persistent factor is "something that the user knows" the factor may not be private for the system to check, and the user may forget the factor. If the persistent factor is "something the user is" the factor requires some human feature recognition (biometrics devices, etc.) and may not be readily available, and may also reveal personal information to the provider.

In example implementations, persistent factors are utilized based on user knowledge ("something you know") and may also be based on something the user possesses. Such requirements may be difficult to fulfill with many of the existing situations. Therefore, example implementations may involve a solution based on user knowledge, assuming the user can remember many basic questions reliably, and entangling the answers with cryptographic operations.

Self and Other People's Knowledge: While example implementations presented as "user knowledge" based, the knowledge can be acquired from trustees and other sources in real time, and the accumulation of knowledge can represent user personal knowledge and user access to trustees. Trustees can represent part of the knowledge about the user and help him in producing the factors needed.

Example implementations can involve a basic process for emergency recovery of access to the account, but can also be implemented as a general authentication method that balances privacy and authenticity and takes usability into account (e.g. user training and user interfaces to train the user when the factor is needed).

The accounts that users have from the Internet account provider are gaining importance as users keep their email, e-payments, personal content, and so on in the account. These accounts are major personal resources and are susceptible to attackers. Example implementations are directed to systems and methods such that the user can retain and re-claim the account in a way that a hijacker cannot, if the user has a persistent authentication factor that is always available to the user and never to the attacker. Approximating such a factor may ease the recovery process.

It is the case that in the related art that when an account like an email account is hijacked, an attacker has the state of the account and can manipulate the account so that recovery by the non-malicious account holder who is the user may be harder. The attacker can also learn from all the data stored in the account. Example implementations therefore utilize mechanisms that cannot be inferred from having access to the account. Similarly, the mechanisms should be such that they cannot be lost if the account is not available (e.g., hijacked). The recovery is then dominated by the holder of the persistent factors.

Example implementations employ a high-entropy source of user knowledge, or knowledge that the user can re-create when required. For this purpose, a large amount of very private user information is utilized—names of siblings, children, spouse, parents, grandparents, friends, addresses of self and relatives, account names and/or numbers, name of employers and more. The information should be such that the user is able to re-create the answers if required, and the amount and variability of the data is such that enough bits are never known to an attacker. Similarly, other factors like biometric reading or access to trustees like bank servers, are also assumed to be in combination, not known to the attacker.

In another example implementation, the factor can be generated by a process that has input, processing and output for generation and for checking the factor. The process may involve user input, system input and a cryptographic computation, each having a role.

The input can involve a high-entropy source of knowledge, such as a set of questions that the user is asked $Q1, Q2, Q3$, etc. and answers: $A1, A2, A3$, etc. The answers $Ai$'s should be such that the user is able to remember (the questions can be asked a number of times and the user can thereby be trained to answer them). The choice of such questions can involve life questions, taste questions (in various areas), personal history questions, etc. Further, the number of questions should be large enough to create the desired entropy. Depending on the desired implementation, random values can also be employed that the user keeps on the hand held device, or a piece Each Gi is hashed with a cryptographic of paper, or is mailed to the user and is kept outside Internet accounts: $R1$, $R2$, etc., and/or added random values that the user local system keeps, and a secret S.

The processing can involve factor generation. Given the inputs to questions: $A1, A2, \ldots An$, the answers are organized into groups (with repetitions), e.g., $G1=A1,A3,A5$, $G2=A1,A3,A6,A7$. A group represents a set of concatenated answers the user is expected to answer in full. Assume m groups, wherein each group has high enough entropy. Depending on the desired implementation, random values $R1, \ldots Rm$ and the secret S may also be added (concatenated), e.g., S to each group and Ri to Gi, so $G1=S,R1,A1,A3$, $A5$.hash function (e.g., Sha1, etc.) H. For example, $H1=H(H(H(H(R), S1) A1)A3)A5)$. Additional hashing for slowing down the computation may also take place. The $H\_i$'s are called indicators.

Each group has its own indicator Hi: $H1, H2, \ldots Hm$. The random values Ri, called randomizers, are kept in the user system (e.g., not accessible by the server, or encrypted under S and sent to the server), and S is the user's secret kept outside the system (e.g., on a paper or in another device kept for recovery, or at trustees, and in no other place). Let $E\_S(Ri)=Xi$, wherein Xi is the encryption of Ri used in Hi and S is called the seed. Hi, Xi $i=1, \ldots, m$ are sent to the server. The indicators Hi's are then erased on the client side and in his device.

S, the seed, is kept at the user's memory outside the account storage (e.g., on a device or a paper). The Hi's are sent to the server to be kept for recovery validation, and the local copy is erased. The server may further hash with one-way functions the indicators, to prevent penetrating attackers from learning the indicators.

From the above example implementation, the server therefore receives no information on the answers, and only receives a hashed value with sufficient entropy. The user should be able to answer enough questions to match one group. An attacker should not be able to guess the answers to cover even one group, and has no access to S.

The factors can then be used for authorization. In the authentication process or the account recovery process, the attempt to use the persistent factor takes place. The server presents the questions of one of the group, wherein the user chooses a group, answers the questions, inputs its S and its device, in turn, recovers Ri from Xi using its secret S. The Hi is computed from scratch, based on user current answers generating answer group Gi-current (a candidate for Gi) and the generated Hi is sent to the server. The user may compute the entire indicator from the answers; alternatively some of the answers in the indicators (like A5 in the example) can be sent on the clear and partially evaluated indicator $H(H(H(H(R), S1) A1)A3)$ in the example, can be sent and the user can complete the indicator computation (so some answers are hidden and some are open—only at recovery).

The server compares the computed generated Hi which is then hashed with the stored hashed Hi. If there is a match, the user is authenticated. Otherwise the claimant (e.g., if the generated Hi fails on various groups) is failed and is not recognized as the original user. Note that in an alternative example implementation, the user may engage in a protocol proving the possession of Hi, relative to a hashed version HASH(Hi).

The answers may require personal information about the user, but the information is all local to the user computer or the user device and is not accessible by the server for privacy purposes nor is it accessible to phishing parties pretending to be the server. Since the answers are erased, they are reconstructed at query time. Also, partial information can be given: such as the partial nested hashing is calculated and A5 is given in the clear, and the server completes the hashing.

For an implementation such as $H(R)*H(A1)*H(A3)*H(A5)$ (i.e., a multiplication of hashes of individual values in a large enough field) as the combining function, a partial product can be provided, wherein some of the answers can be open and the server can complete the product. For a position fixed test, $H(R)*H(1, A1)*H(2, A3)*H(3, A5)$ can be provided, so that the answer Ai at position j of the questionnaire is associated with the position j. The product can be performed over a large prime order field.

The information should have enough entropy to hide the individual fields given the server's state, such that the probability of an attacker producing the answer is substantially small. The user further needs to ensure that the factor is given to the right server. Trying to learn the factor (off line attacks) or factors that open some of the answers (real time attacks) are possible and should considered in the implementation.

Further, a set of highly memorized answers should be used and user training should be in place before the values are committed (recorded) at the server will help this. Non easy to remember answers may be written down, to ensure that the factor is persistent. Example implementations can be such that a general software system can be employed without special devices/readers/etc.

Example implementations can involve a system or process where answers are obtained by the users from external agencies, rather than remembered. These agencies rely on authentication to allow the user to retrieve the answer, so the implementation can build an implicit "social recovery" using the persistent factor above. The factor can be built incrementally, by passing the previous test first and then updating the knowledge embedded in the factor. Further, the persistent factor can be restricted so that it is used when needed and can be supported by other factors, and be included as one additional decisive factor in a recovery of account or reclaiming of account process. Note that answers from user and trustees can be obtained employing any input method: typing, voice, biometric reading, camera, etc.

The example implementations described above thereby allows the user to replace a password with knowledge that the user enters. Unlike passwords, the user most likely knows pieces of knowledge about the user (a large portion thereof). Password usage can be utilized for local decryption of password encrypted info (like a private key). Extending this new idea can be used for password drop-in replacement for such purposes, and is a matter of another design where the "device" is merely local computation. The "local computation" can be done on a mobile device and the final result sent to the computer or server via a local communication method, such as a wireless, USB or physical connection, to ensure the user that the answers are not stolen.

Example implementations can also involve a persistent factor which the user can always reconstruct, even if other means of identification has been lost. This can distinguish the user from an account hijacker, and be used for claiming accounts back by users (e.g. a method on claiming back based on questionnaire and minimizing exposure is in place).

FIG. 1(a) illustrates a flow diagram for a device, in accordance with an example implementation. At 100, the device generates a plurality of hashes from a plurality of responses provided by the user, to a plurality of questions. The questions provided can be from a server, or from the device, and utilize a questionnaire involving personal information about the user as described above.

At 101, the device can generate an authentication hash from the plurality of hashes. This can be implemented by conducting a polynomial interpolation of the plurality of hashes to generate the authentication hash, and/or by selecting one or more of the plurality of hashes to form the authentication hash based on a selected group of the plurality of questions. As described in the above example implementations, the user can select a group of questions to answer, and the answers can thereby be hashed to generate the authentication hash, or the device can select a subset of the provided answers (e.g. two or more) and generate an authentication hash based on the subset. As described in above example implementations, a secret authentication hash can also be stored in the device, and forwarded to the server by a secure protocol when the requirements are met (e.g., meeting a threshold of correct answers to the questions, answering a subset of the questions correctly, the authentication hash matching the secret authentication hash, etc.).

The device may also generate the authentication hash from a polynomial interpolation of the plurality of hashes from use of a polynomial interpolation to interpolate the authentication hash, as described above. Implementations such as the polynomial interpolation algorithm and noisy interpolation algorithm can be employed. A threshold can be adjusted and applied to the polynomial interpolation through the introduction of one or more erroneous points for the polynomial interpolation, using added points at the server and/or one or more correct points for the polynomial interpolation. At 102, the device then attempts to authenticate to the server with the generated authentication hash.

FIG. 1(b) illustrates a flow chart for a recovery process, in accordance with an example implementation. As described in above example implementations, at 103, the device receives a plurality of questions, of which the user may select a subset to answer to recover access to the account. At 104, the answers provided are converted into an authentication hash based on the use of a random number generated from a secret seed that is outside the user device. At 105, the authentication hash is forwarded to the server.

FIG. 2(a) illustrates a flow diagram for a server, in accordance with an example implementation. At 200, the server may transmit a plurality of personal questions to the device. At 201, the server receives an authentication hash from a device in response to the transmitted plurality of questions. At 202, the server may then decide to grant access 204 (YES) when an authentication hash responsive to the transmitted plurality of questions matches a secret authentication hash stored in the server; and deny access 203 (NO) when the authentication hash does not match the secret authentication hash. The authentication hash may be generated from a polynomial interpolation of the plurality of hashes, and a selection of one or more of the plurality of hashes to form the authentication hash based on a selected group of the plurality of questions. Depending on the implementation, the server may transmit one or more erroneous points, and one or more correct points for use in a noisy interpolation algorithm, based on the secret authentication hash and a threshold. The server may also conduct hashing of the received authentication hash to determine if the hash matches the stored secret hash.

In another example, the server may select the secret authentication hash from a plurality of secret authentication hashes based on a selected group of the transmitted questions, wherein each of the plurality of secret authentication hashes is associated with at least two of the plurality of questions. The selected group of transmitted questions may be selected at the device or by the server. This can be implemented, for example, in a recovery process as described above.

Figure 2B:
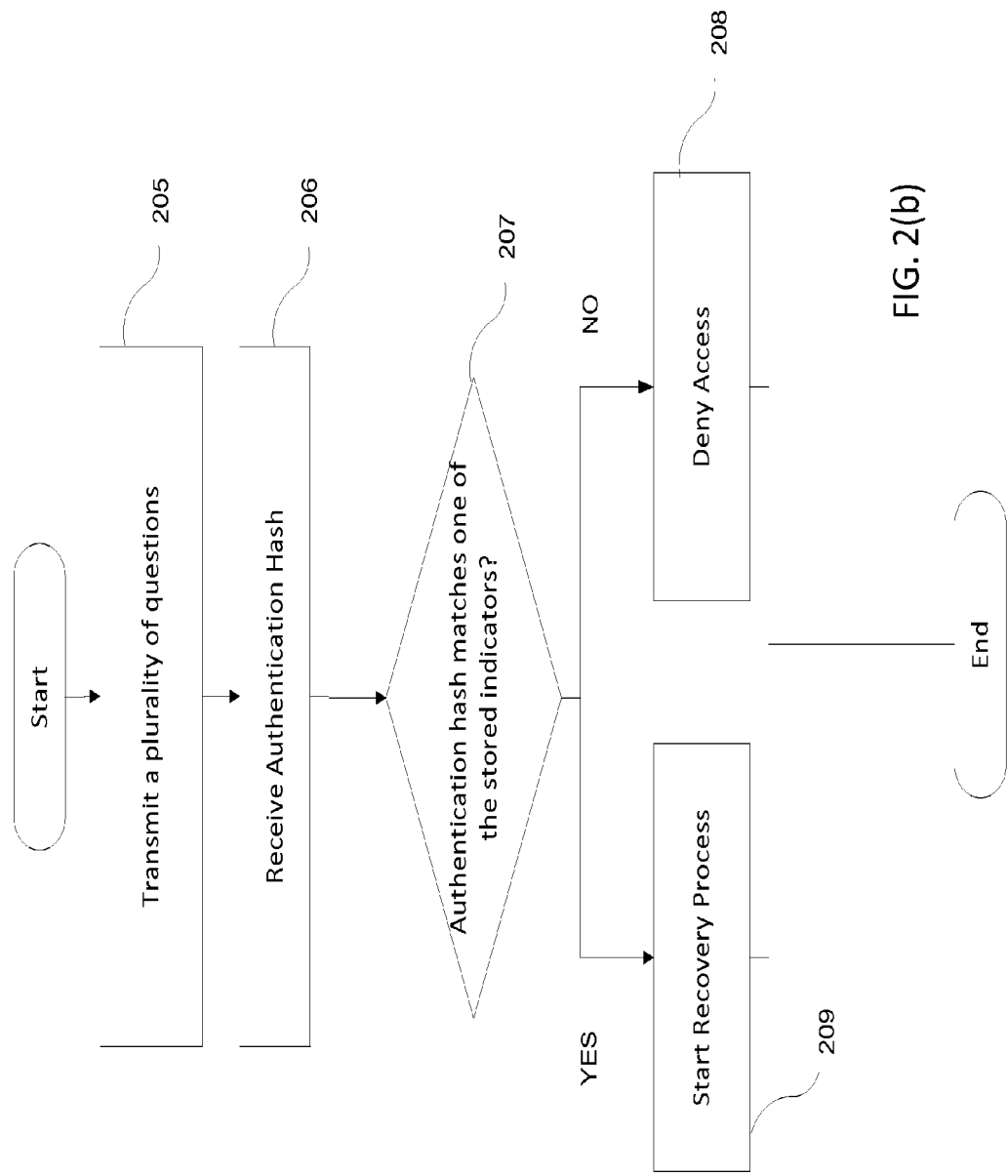

FIG. 2(b) illustrates a flow diagram for a recovery process from the server, in accordance with an example implementation. At 205, the server may transmit a plurality of personal questions to the device. At 206, the server receives an authentication hash from a device in response to the transmitted plurality of questions, wherein the authentication hash is potentially one of the indicators as described in above example implementations. At 207, the server may then decide to start a process for recovering the user account 209 (YES) when the authentication hash matches one of the indicators stored in the server; and deny access 208 (NO) when the authentication hash does not match any of the stored indicators.

EXAMPLE PROCESSING ENVIRONMENT

Figure 3:
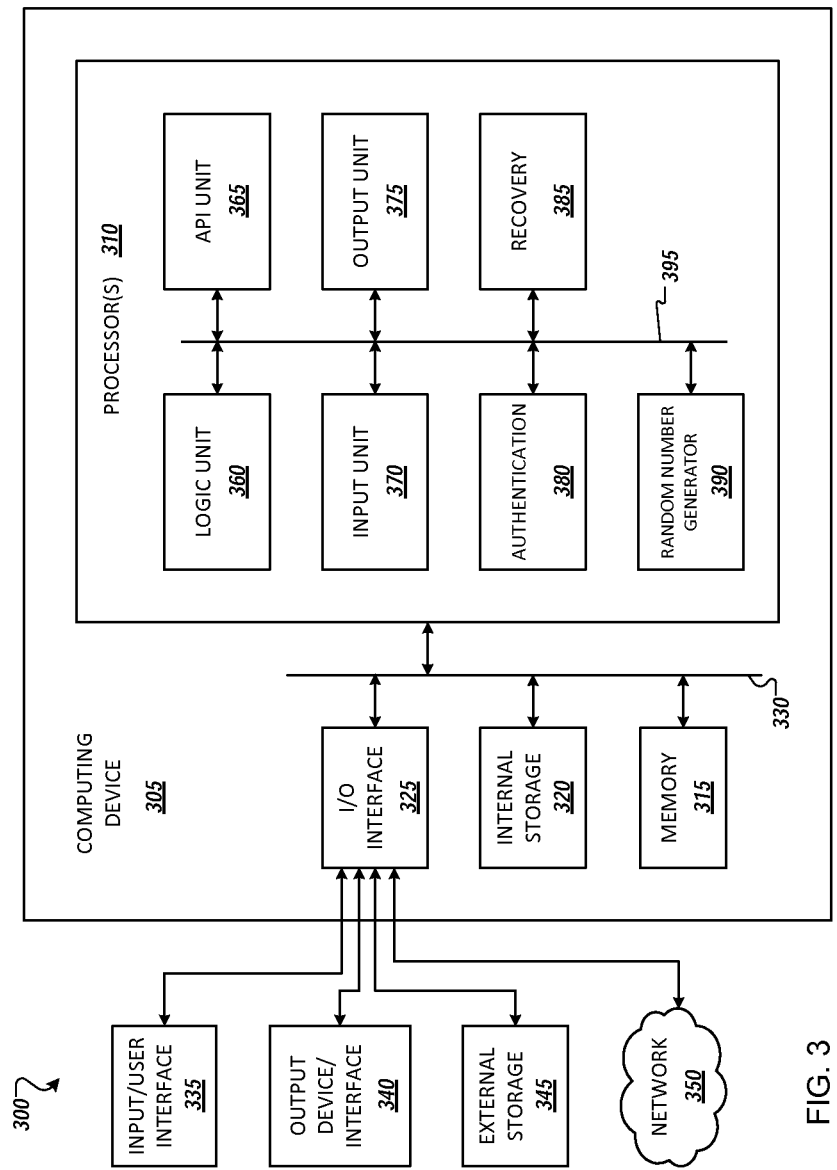
FIG. 3 illustrates an example computing environment with an example computing device suitable for use in some example implementations.

FIG. 3 shows an example computing environment with an example computing device suitable for use in some example implementations. Computing device 305 in computing environment 300 can include one or more processing units, cores, or processors 310, memory 315 (e.g., RAM, ROM, and/or the like), internal storage 320 (e.g., magnetic, optical, solid state storage, and/or organic), and/or I/O interface 325, any of which can be coupled on a communication mechanism or bus 330 for communicating information or embedded in the computing device 305.

Computing device 305 can be communicatively coupled to input/user interface 325 and output device/interface 340. Either one or both of input/user interface 325 and output device/interface 340 can be a wired or wireless interface and can be detachable. Input/user interface 325 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 340 may include a display, television, monitor, printer, speaker, braille, or the like. In some example implementations, input/user interface 325 and output device/interface 340 can be embedded with or physically coupled to the computing device 305. In other example implementations, other computing devices may function as or provide the functions of input/user interface 325 and output device/interface 340 for a computing device 605.

Examples of computing device 305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, servers, and the like).

Computing device 305 can be communicatively coupled (e.g., via I/O interface 325) to external storage 345 and network 350 for communicating with any number of networked components, devices, and systems, including one or more computing devices of the same or different configuration. Computing device 305 or any connected computing device can be functioning as, providing services of, or referred to as a server, client, thin server, general machine, special-purpose machine, or another label.

I/O interface 325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 300. Network 350 can be any network or combination of networks (e.g., the Internet, local area network, wide area network, a telephonic network, a cellular network, satellite network, and the like).

Computing device 305 can use and/or communicate using computer-usable or computer-readable media, including signal media and storage media. Signal media include transmission media (e.g., metal cables, fiber optics), signals, carrier waves, and the like. Storage media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 310 can execute under any operating system (OS) (not shown), in a native or virtual environment. One or more applications can be deployed that include logic unit 360, application programming interface (API) unit 365, input unit 370, output unit 375, authentication unit 380, recovery unit 385, random number generator unit 390, and inter-unit communication mechanism 395 for the different units to communicate with each other, with the OS, and with other applications (not shown). For example, authentication unit 380, recovery unit 385, and random number generator unit 390 may implement one or more processes as shown in FIGS. 1(*a*), 1(*b*), 2(*a*) and 2(*b*), depending on the implementation as a device or a server. Recovery unit 385 may also implement the recovery processes as described in the above example implementations of FIGS. 1(*b*) and 2(*b*). The described units and elements can be varied in design, function, configuration, or implementation and are not limited to the descriptions provided.

In some example implementations, when information or an execution instruction is received by API unit 365, it may be communicated to one or more other units (e.g., logic unit 360, input unit 370, output unit 375, authentication unit 380, recovery unit 385, and random number generator unit 390). For example, random number generator unit 390 may be used to generate hashes or select questions for submission, and use the API unit 365 to communicate with the authentication unit 380 and the recovery unit 385 to provide random numbers as described in the above example implementations. Authentication unit 380 may, via API unit 365, interact with the recovery unit 385 to compare an authentication hash with a stored secret authentication hash.

In some instances, logic unit 360 may be configured to control the information flow among the units and direct the services provided by API unit 365, input unit 370, output unit 375, authentication unit 380, recovery unit 385, and random number generator unit 390 in some example implementations described above. For example, the flow of one or more processes or implementations may be controlled by logic unit 360 alone or in conjunction with API unit 365.

Example Processing Environment

Figure 4:
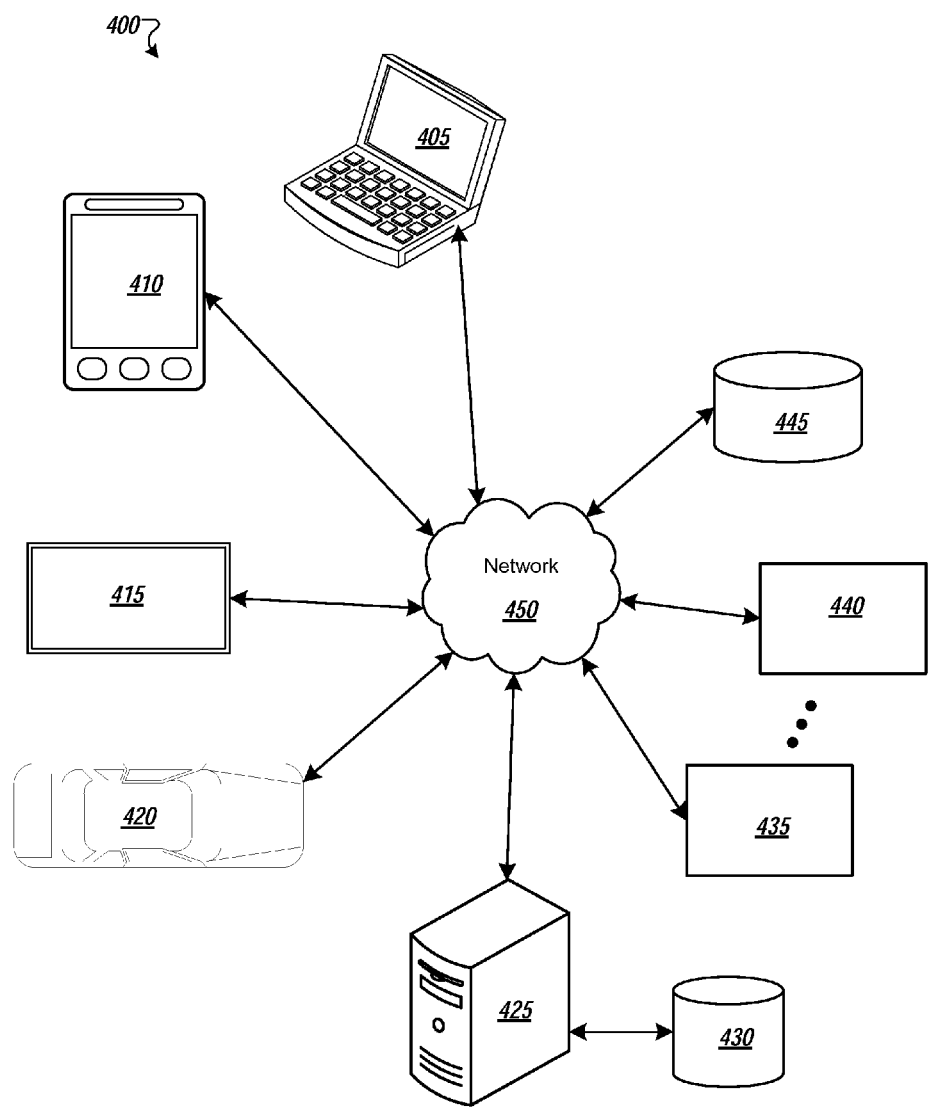
FIG. 4 illustrates an example processing environment according to the example implementation.

FIG. 4 shows an example online environment in which some example embodiments may be implemented. Environment 400 includes devices 405-445, each is communicatively connected to at least one other device via, for example, network 450. Some devices may be communicatively connected to one or more storage devices 430 and 445 (e.g., via device 425).

An example of one or more devices 405-450 may be computing device 605 described below in FIG. 6. Devices 405-450 may include, but are not limited to, a computer 425 (e.g., personal or commercial), a device associated with a vehicle 420, a mobile device 410 (e.g., smartphone), a television 415, a mobile computer 405, a server computer 450, computing devices 435-440, storage devices 430, 445. Any of devices 405-450 may access one or more services from and/or provide one or more services to one or more devices shown in environment 400 and/or devices not shown in environment 400. Accessing among devices can be wired, wireless, and by means of multimedia communication like user voice, camera pictures, etc.

A user may control a device, as explained above, to implement the example implementations, via network 450. Information associated with the example implementations may be stored at storage device 430 or 445, respectively, for example.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A device, comprising:
a processor, configured to:
generate a plurality of hashes from a plurality of responses to a plurality of questions;
generate an authentication hash from a polynomial interpolation of the plurality of hashes and algebraic operations over the plurality of hashes by use of a noisy interpolation algorithm, and adjust a threshold of the noisy interpolation algorithm by introduction of one of: one or more erroneous points for the polynomial interpolation, and one or more points for the polynomial interpolation; and
authenticate with the authentication hash; and
a memory configured to store the authentication hash.

2. The device of claim 1, wherein the processor is configured to generate the authentication hash from the selection based on a selection of one of the plurality of hashes as the authentication hash, and wherein the processor is configured to generate each of the plurality of hashes from at least two of the plurality of responses.

3. The device of claim 1, further comprising a memory configured to store a secret authentication hash, and wherein the processor is configured to authenticate with the authentication hash through a comparison of the secret authentication hash with the authentication hash, and further configured to:
use the secret authentication hash for authentication when the authentication hash matches the secret authentication hash, and
deny authentication when the authentication hash does not match the secret authentication hash.

4. The device of claim 1, wherein the processor is configured to generate the authentication hash from the selection based on use of the plurality of hashes that correspond to the plurality of responses associated with the selected group of the plurality of questions to form the authentication hash.

5. A non-transitory computer readable storage medium storing instructions for executing a process, the instructions comprising:
generating a plurality of hashes from a plurality of responses to a plurality of questions;
generating an authentication hash from a polynomial interpolation of the plurality of hashes and algebraic operations over the plurality of hashes by use of a noisy interpolation algorithm, and adjust a threshold of the noisy interpolation algorithm by introduction of one of: one or more erroneous points for the polynomial interpolation, and one or more points for the polynomial interpolation; and
authenticating with the authentication hash.

6. The computer readable storage medium of claim 5, wherein the generating the authentication hash from the plurality of hashes comprises performing a polynomial interpolation of the plurality of hashes.

7. The computer readable storage medium of claim 6, wherein the authenticating with the authentication hash comprises:
comparing a secret authentication hash with the authentication hash;
using the secret authentication hash for authentication when the authentication hash matches the secret authentication hash, and
denying authentication when the authentication hash does not match the secret authentication hash.

8. The computer readable storage medium of claim 5, wherein each of the plurality of hashes is generated from at least two of the plurality of responses; and wherein generating the authentication hash from the plurality of hashes comprises selecting one of the plurality of hashes as the authentication hash based on a selected group of the plurality of questions.

9. A server, comprising:
a processor configured to:
transmit a plurality of questions; and grant access when an authentication hash responsive to the transmitted plurality of questions matches a secret authentication hash; and deny access when the authentication hash does not match the secret authentication hash; wherein the authentication hash is generated from a polynomial interpolation of the plurality of hashes and algebraic operations over the plurality of hashes by use of a noisy interpolation algorithm, and adjust a threshold of the noisy interpolation algorithm by introduction of one of: one or more erroneous points for the polynomial interpolation, and one or more points for the polynomial interpolation; and
a memory configured to store the authentication hash.

10. The server of claim 9, wherein the processor is configured to generate and transmit at least one of: one or more erroneous points, and one or more correct points for use in a noisy interpolation algorithm, based on the secret authentication hash and a threshold.

11. The server of claim 9, wherein the processor is configured to select the secret authentication hash from a plurality of secret authentication hashes based on a selected group of the transmitted questions, wherein each of the plurality of secret authentication hashes is associated with at least two of the plurality of questions.

12. The server of claim 9, wherein the processor is further configured to:
receive a response to the plurality of questions, the response comprising a response hash and an answer to one or a subset of the plurality of questions; and
construct the authentication hash from the response hash and the answer.

13. The server of claim 12, wherein the processor is configured to construct the authentication hash by constructing a nested hash from the response hash and the answer.

14. The server of claim 12, wherein the processor is configured to construct the authentication hash by multiplying the response hash with a hash of the answer.

15. The server of claim 9, wherein the processor is further configured to receive the secret authentication hash and store the secret authentication hash into a memory after receiving a confirmation from a device associated a user and an account associated with the user.

16. The server of claim 9, wherein the plurality of questions comprises a request for biometric information.

* * * * *